United States Patent
Hobbs

[15] 3,656,708
[45] Apr. 18, 1972

[54] DUMP VALVE
[72] Inventor: Milton M. Hobbs, Springfield, Pa.
[73] Assignee: Westinghouse Electric Corporation, Pittsburgh, Pa.
[22] Filed: July 10, 1970
[21] Appl. No.: 53,965

[52] U.S. Cl. ........................................................251/63.6
[51] Int. Cl. ......................................................F16k 31/143
[58] Field of Search.....................251/63, 63.5, 63.6, 73, 84; 137/111, 114

[56] References Cited

UNITED STATES PATENTS

| 3,531,078 | 9/1970 | Hose et al.............................251/63.6 X |
| 3,137,474 | 6/1964 | Soderberg et al....................251/73 X |

Primary Examiner—Henry T. Klinksiek
Attorney—A. T. Stratton, F. P. Lyle and F. Cristiano, Jr.

[57] ABSTRACT

A valve structure for quickly dumping the hydraulic actuating fluid in an actuator system. The structure comprises a valve body having a drainage cavity communicating with an actuating fluid inlet. The inlet is blocked by a valve plug secured to an integral valve stem slidably disposed within the valve body. On the opposite end of the valve stem, a piston member and feedback valve member are secured thereto. The feedback valve member prevents communication between a control fluid cavity in the valve and the drainage cavity. The combination of forces from the control fluid and a spring member seats the valve plug to maintain the actuating fluid pressure and also maintains the feedback valve member in a seated position. Upon decay of the control fluid pressure, the force of the actuating fluid unseats the valve plug, allowing dumping of the actuating fluid, and also unseats the feedback valve member, allowing the control fluid to dump into the drain cavity. The dumping of the control fluid enables the faster dumping of the actuating fluid.

9 Claims, 3 Drawing Figures

INVENTOR
Milton M. Hobbs 3,656,708

DUMP VALVE

BACKGROUND OF THE INVENTION

The following invention relates to a valve structure for quickly dumping the hydraulic actuating fluid of an actuator system. The actuator system may regulate a valve which may be used on a turbo-generator unit.

As steam turbines are increasing in size, there is a corresponding increase in steam requirements for the turbines. Therefore, the valves which regulate and control the flow of steam through the conduits also increase in size. It is imperative, however, that the valves which regulate or shut off the flow of steam to the turbine quickly react to the control or emergency signals to protect the turbine from overspeeding or overheating.

Valves of the type which are used in the turbine steam conduits are throttling valves, governing valves, reheat stop valves and interceptor valves. Each of these valves is generally regulated and/or actuated by an actuator system. The system generally is comprised of an actuator which may be of the push or pull type. The actuator opens and closes the valves in response to external control or emergency signals. A dump valve, which is part of the actuator system, dumps the hydraulic actuating fluid of the actuator in response to an emergency signal, and upon receiving such signal must quickly and dependably dump the actuating fluid, thus enabling the valve to close and shut off the steam to protect the turbine.

It would be desirable then to design a dump valve which can quickly dump a large quantity of hydraulic fluid of an actuator, which is dependable, and which is relatively small in size.

BRIEF SUMMARY OF THE INVENTION

Briefly, in accordance with the invention, there is provided a valve structure for dumping the hydraulic actuating fluid of an actuator system. The valve structure is provided with a valve body having a valve stem slidably disposed within the body. On one end of the stem is a plug member disposed within a drainage cavity in the valve body. The plug member is arranged to block and unblock the hydraulic actuating fluid from a fluid inlet from the actuator to the drainage cavity. On the opposite end of the valve stem is a piston member secured thereon. Also secured to the stem below the piston member is a feedback valve member. Both the piston member and the valve member are disposed within a control fluid cavity. The piston member and the feedback valve cooperate to prevent fluid communication between the control fluid cavity and the drain cavity.

The combination of forces from the control fluid and a spring member within the drain cavity cooperate to seat both the valve plug, to maintain the actuating fluid pressure, and the feedback valve member, to maintain control fluid pressure.

Upon receiving an external signal, the control fluid pressure decays. The force of the actuating fluid unseats both the valve plug and the feedback valve member and allows the quick dumping of the actuating fluid and the control fluid into the drain cavity.

The feedback valve member enables the fast dumping of the actuator fluid and the structural arrangement results in a dependable but relatively small dump valve structure.

DESCRIPTION OF THE PREFERRED EMBODIMENT

Figure 1:
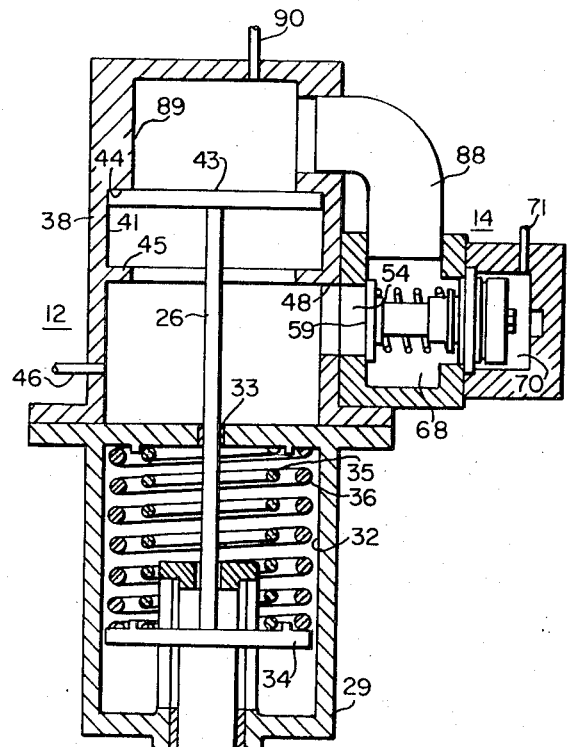
FIG. 1 is a longitudinal central sectional view of a valve structure controlled by an actuator system having a dump valve formed in accordance with the principles of the invention.
Figure 1:
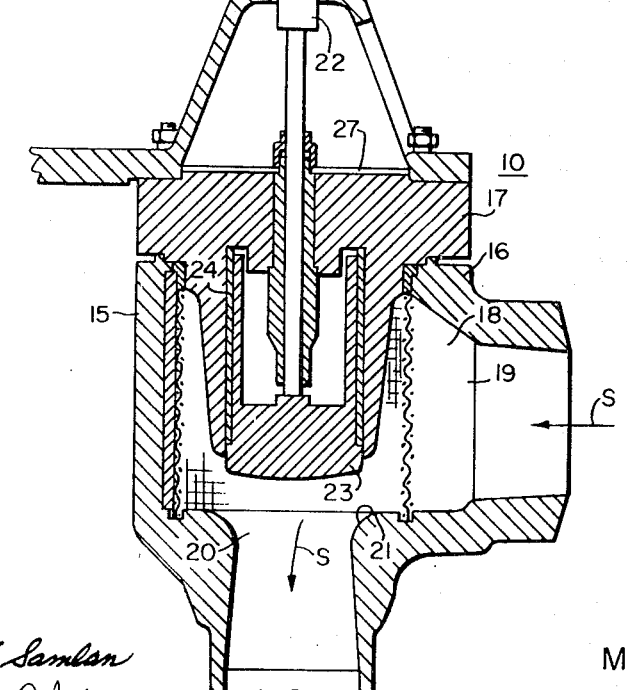

Referring to the drawings in detail, and particularly FIG. 1, there is shown a valve structure 10 controlled by an actuator 12. The hydraulic actuating fluid pressure for the actuator 12 is maintained by a dump valve structure 14 formed in accordance with the invention.

The valve 10, as illustrated, is of the type known as an interceptor valve, an example of which is shown in R. O. Brown et al., U.S. Pat. No. 3,286,979 and which is assigned to the present assignee. Such valves are generally employed in the steam turbine art for controlling steam flow from one turbine unit to another turbine unit. The function of these valves is to intercept the flow of steam from the higher pressure unit to the lower, in the event of sudden loss of load or other malfunction, so that steam is not permitted to flow into the lower pressure unit. The valve 10 is not part of the present invention, however, and can be of other well known types employed in steam systems such as throttling valves, governing valves, and reheat stop valves.

The valve structure 10 is provided with a body structure having a cup-shaped body member 15, of generally cylindrical configuration, having an annular open end 16, cooperatively associated with an upper closure member 17, to form a valve chamber 18. The valve body 15 is provided with a tubular fluid inlet port 19 and a tubular outlet port 20 communicating with the valve chamber.

The outlet port 20 is provided with a smoothly rounded valve seat 21 of annular shape. A movable valve member 22 extends through the closure member 17 into the valve chamber 18 and is arranged in a manner to block and unblock the outlet port 20.

The movable valve member 22 includes a cylindrical plug member 23, slidably received in a bore 24. The valve plug 23 is attached to an actuating rod 26 slidably received in a sealing member 27 disposed in the upper closure member 17, so that during use, leakage is minimized between the rod 26 and the closure 17, as well known in the art.

The valve member 22 may be positioned in any suitable manner but as shown is positioned and operated on the vertical axis of the valve 10. The plug 23 of the movable valve member 22 is disposed in blocking location with the valve seat 21 and is moved in an upwardly axial direction to unblock the latter. A cylindrical shell structure 29 is rigidly attached to the closure member 17 in any suitable manner. The shell 29 has a lower bore 31, through which the actuating rod 26 extends into the space 32 formed by the shell 29, and an aperture 33 at its upper end through which the rod 26 extends.

The rod 26 is provided with a plate or disc member 34 rigidly attached thereto, and is biased in the downward direction by a pair of concentric helical springs 35 and 36 disposed in compression with the shell 29. The springs 35 and 36 maintain the valve member 22 in the blocking position with the valve seat 21.

The housing structure 38 of the actuator 12 which may be of any suitable shape, is secured to the shell structure 29. The actuating rod 26 extends into a cylindrical bore 41 defined by the structure 38. At the upper end of the actuating rod 26 is a piston member 43 disposed in slidable relation with the bore 41. The stroke of the actuating rod 26 is defined by annular shoulders 44 and 45 projecting inwardly from the structure 38. The piston 43 is shown seated against the annular shoulder 44 when the plug 23 is in the open position. A high pressure fluid inlet conduit 46 is in fluid communication with the lower portion of the bore 41 to supply actuating fluid, from a source not shown, to the bore. There is also provided a fluid exit aperture 48 on the wall opposite the inlet 46.

The dump valve structure 14 is secured to the wall structure 38 of the actuator 12 by any suitable means (not shown). The dump valve 14 is shown operated along the central axis of the valve and is preferably, though not essentially, positioned horizontally.

Figure 2:
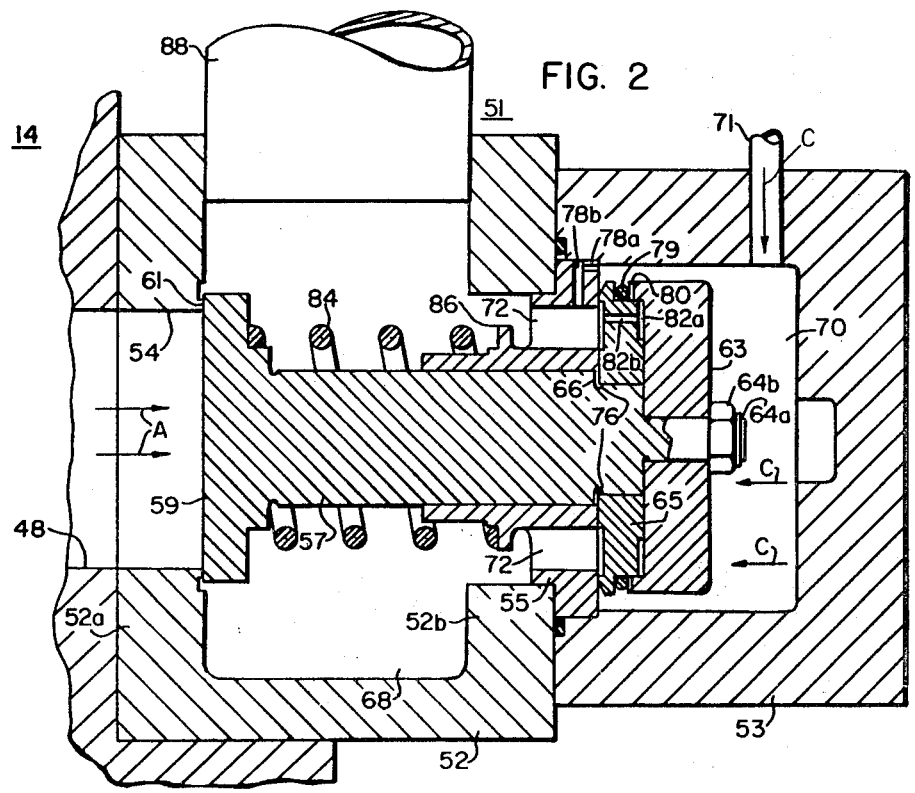
FIG. 2 is an enlarged sectional view of the dump valve shown in FIG. 1 in the closed position.

Referring to FIG. 2, the dump valve 14, shown in the closed position, is provided with a valve body 51 having a main body portion 52 and a capping portion 53, both portions being secured to each other by any suitable means (not shown).

The base 52a of the main body portion 52 of the valve 14 has a central inlet aperture 54. The inlet aperture 54 is aligned with and in fluid communication with the exit aperture 48 of the actuator 12. An annular guiding member or bushing member 55 is concentrically disposed within the valve body 51 and is partially secured to the inner walls of both the main body portion 52 and the cap portion 53.

A disc-shaped dump valve stem member 57 is disposed within the valve body 51 and is slidably disposed within the guiding member or bushing 55. A dump valve plug or closure member 59 is on the end of the stem 57, integral therewith and is disposed within the main body portion 52 of the valve 14. The plug 59 is arranged to block and unblock the inlet aperture 54. The inner walled side of the base 52a of the main body portion 52 of the valve body 51 is provided with a seat 61 of annular shape encompassing the inlet aperture 54. The seat 61 may be finished by a lapping process to insure a fine finish and enable a good seating relation between the valve plug 59 and the seat.

On the opposite end of the stem 57, and extending into the cap portion 53 of the valve body 51, is a piston member 63. The piston member 63 is secured to the stem 57 by a stud 64a and nut 64b arrangement. A disc-shaped positive feedback valve member or closure member 65 is trapped between an annular shoulder 66 on the valve stem 57 and the piston member 63. However, as the valve member 65 moves to the left, the bushing member 55 prevents further movement.

The main body portion 52 of the valve body 51 defines an annularly shaped, actuating fluid drain cavity 68. The cap portion 53 of the valve body 51 defines a control fluid cavity 70. Pressurized control oil, indicated by arrows C, is admitted to the control fluid cavity from a source not shown, through a control fluid conduit 71 in the cap portion 53 of the valve body 51.

A plurality of apertures 72 are annularly disposed in the bushing member 55, in a direction parallel to the central axis of the dump valve 14, to permit fluid communication between the actuating fluid drain cavity 68 and the control fluid cavity 70. The positive feedback valve member 65 and the annular shoulder 66 of the stem 57 are in mutually spaced relation, as indicated by the annular space 76, when the feedback valve member 65 and the plug 59 are in the seated or blocking position.

An axially extending passageway 78a is provided near the annular periphery of the bushing member 55, which passageway exits into a transversely extending passageway 78b, and which is in fluid communication with the control fluid cavity 70, through one of the apertures 72. These passages 78a and 78b allow air bubbles to escape from the control fluid in the cavity 7 as the fluid is pressurized.

An O-ring 79 and an annular back-up ring 80 are sealing means provided between the adjacent sides of the piston member 63 and the feedback valve member 65. The sealing means 79 and 80 help prevent the leakage of control fluid from the control fluid cavity 70 into the area between the piston member 63 and the feedback valve member 65. The sealing means 79 is preferably made of a resilient material. The spring characteristic of the sealing means helps the force from the control fluid with cooperation from the piston member 63, to maintain the feedback valve 65 in a seated position against the bushing member 55.

An annular passageway 82a, defined by a recess in the valve 65 and the adjacent piston member 63, is provided, which is in fluid communication with a plurality of axially extending passageways 82b in the valve member 65, which in turn is in fluid communication with the apertures 72. These passageways 82a and 82b insure drainage of any control fluid which leaks past the seals 79 and 80 between the positive feedback control valve 65 and the piston member 63.

A compression spring 84 is disposed between an annular shoulder 86 on the bushing member 55 and the plug 59 to constantly exert a closing force on the plug in the axial direction.

An exit conduit 88, in fluid communication with the drain cavity 68, is secured to the main body portion 52 of the dump valve 14. The exit conduit 88 may empty into a chamber 89 on top of the piston 43 in the actuator 12, as shown in FIG. 1.

In operation, control fluid enters the control cavity 70 through conduit 71. The combination of forces from the control fluid and the spring member 84 moves the stem 57 in axial closing direction so that the plug 59 is flush against the seat 61 blocking the inlet aperture 54. Furthermore, the piston member 63 is compressed against the resilient O-ring 79 and back-up ring 80, holding the positive feedback valve member 65 in a seated position against the bushing member 55, and thereby allowing pressure build-up of the control fluid in the control cavity 70.

As the inlet aperture 54 of the dump valve 14 is closed, hydraulic actuating fluid enters the bore 41 (FIG. 1) of actuator 12 through the inlet conduit 46. The force due to the actuating fluid, as it increases in pressure, pushes up against piston 43 raising the piston and the connected actuating rod 26 in an upward direction. The stroke of actuating rod 26 is defined by the shoulders 45 and 44 on the structure 38 of the actuator 12. The actuating rod 26 lifts the disc member 34 in the cylindrical shell structure 29 against the closing forces exerted by the springs 35 and 36. This raises the valve member 22 which in turn lifts the plug member 23 from its seat 20, to permit steam flow through the valve structure 10, the steam flow being indicated by the arrows S.

Upon an emergency signal trip, the control fluid pressure in the control conduit 71 and in the control fluid cavity 70 begins to decay (FIG. 2). The unseating force, which is the actuator fluid acting against the face of the valve plug 59, unseats the plug 59 at approximately the same time as there is a reduction in pressure of the control fluid, since the force acting in the closing direction exerted on the stem 57 by the control fluid is approximately equal to the actuating fluid force, the spring force being relatively small compared to the control fluid force.

Figure 3:
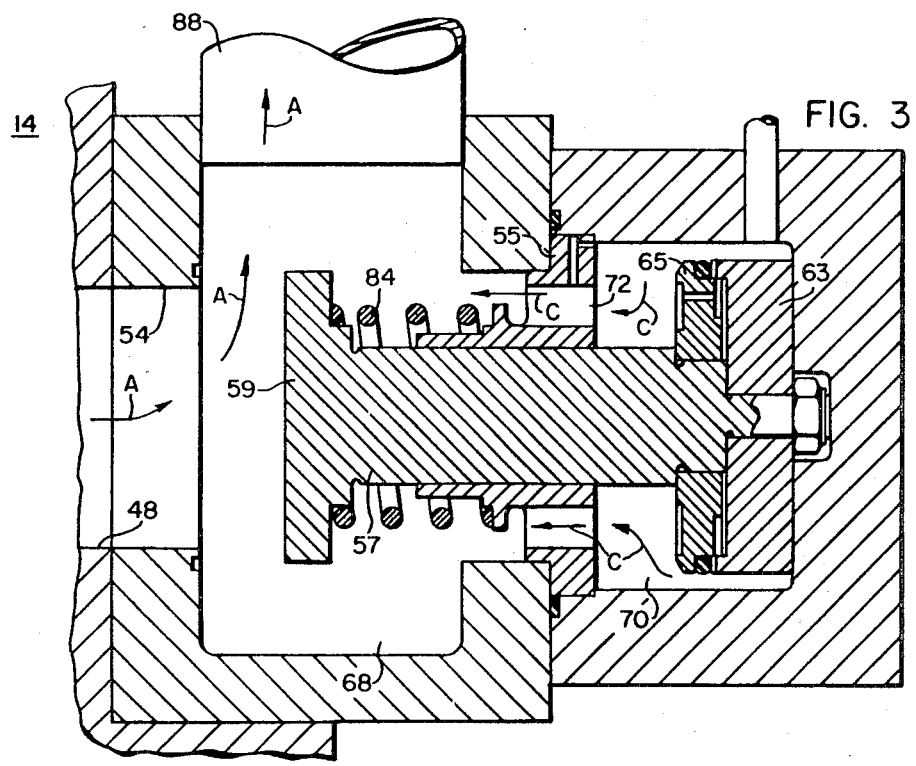
FIG. 3 is a view similar to that shown in FIG. 2 but with the dump valve in an open position.

The plug 59, the stem 57 and the piston member 63 initially begin to open as a unit in the axial direction. The positive feedback valve member 65 will not move until the stem 57 moves the axial distance of the space 76 and the shoulder 66 engages the positive feedback valve member. At this moment in time, actuating fluid indicated by arrows A as shown in FIG. 2, is dumping into the actuating fluid drain cavity 68 and through the exit conduit 88. As the control fluid pressure continues to decay, the feedback valve member 65 begins to unseat. The control fluid in cavity 70 indicated by arrows C (FIG. 3), which is still highly pressurized, dumps through the apertures 72 into drain cavity 68, very quickly dumping the control fluid. This positive feedback action enables the plug 59 to more quickly move to an open position, thus providing a quicker dumping of the actuating fluid as seen in FIG. 3, which shows the dump valve 14 in a fully open or dump position.

Referring to FIG. 1, it can be seen that the actuating fluid and the control fluid exit through conduit 88 into a chamber 89 on top of piston 43 in the actuator 12, which provides a convenient reservoir for the fluid. A drain conduit 90 is provided in fluid communication with the chamber 89 which returns the fluid to a reservoir.

As the actuating fluid decays, due to the dumping, spring members 35 and 36 quickly lower the piston 43 and actuating rod 26, since the spring force of springs 35 and 36 is greater than the force exerted by the actuating fluid. The disc member 34 is lowered and the valve member 22 is quickly moved in a closing direction moving the plug member 23 to a closed position on seat 21 and thereby stopping the flow of steam S through the valve structure 10.

As previously mentioned, the feedback valve member 65, when in the closed position, is in a biased relation with the bushing member 55 (FIG. 2), because of the annular space 76 between the shoulder 66 and the valve member 65. This space 76 also serves the function of allowing the plug 59 to move from the closed position to a partially open position, if the force from the actuating fluid A (FIG. 2) is greater than the force from the control fluid C plus the force from the spring member 84. This transient condition occurs when either the actuating fluid pressure temporarily increases to a higher value than it should, or when the control fluid pressure temporarily decreases to a value lower than it should be. These transient forces, then, can be relieved by the automatic opening of the plug 59, and without opening the feedback valve member 65, which would dump the control fluid resulting in a complete closing of the valve structure 10.

Furthermore when the actuator system is in the dump position, the pressurized actuating fluid entering the bore 41 through the conduit 46 (FIG. 1) can, under certain flow conditions, move the plug 59 to a partially open position, to relieve that flow without opening the positive feedback control valve 65 and dumping the control fluid. Therefore, the actuating fluid supply does not have to be interrupted to regain control fluid pressure to reseat the positive control feedback valve 65.

What is shown, then, is a dump valve 14 which can quickly dump the actuating fluid of an actuator system, which is compact in design because of the use of a positive feedback control valve 65 and the dumping of the fluid back into the actuator system 12, and which is dependable.

Although the invention has been shown in only one form, it will be obvious to those skilled in the art that it is not so limited, but is susceptible of various changes and modifications without departing from the spirit thereof.

What is claimed is:

1. A valve structure for dumping actuating fluid in an actuator system comprising:
   a valve body;
   a first portion of said valve body defining a drain cavity for drainage of the actuating fluid from said actuator system;
   said drain cavity having an actuating fluid inlet passage fluidly communicable with said actuator system and a fluid outlet passage;
   a second portion of said valve body defining a control fluid cavity;
   said control fluid cavity having a control fluid inlet passage and a control fluid outlet, said outlet fluidly communicable with said drain cavity;
   a valve stem;
   means to slidably support said valve stem within said drain cavity in said control fluid cavity;
   a first closure member secured to one end of said stem to block and unblock said actuating fluid inlet passage in said drain cavity;
   a piston member secured to the opposite end of said stem in said control fluid cavity;
   a second closure member slidably disposed around said shaft in said control fluid cavity;
   said second closure member cooperating with said piston member to block and unblock said control fluid outlet in response to the pressure of the control fluid in said control cavity.

2. The structure recited in claim 1 and further including a spring member disposed within the valve body; the force from said spring acting on the said stem and the force of the control fluid acting on the piston member, cooperatively biasing the first and second closure members to their respective blocking positions.

3. The structure recited in claim 1 wherein the second closure member is disposed between a shoulder on the valve stem and the piston member.

4. The structure recited in claim 1 wherein an annular bushing member is disposed within the valve body to slidably guide the valve stem.

5. The structure recited in claim 4 wherein a plurality of apertures are annularly disposed in the periphery of the bushing member in a direction parallel to the central axis of the valve structure, said apertures providing fluid communication between the drain cavity and the control fluid cavity.

6. The structure recited in claim 1 wherein an annular bushing member is secured to the valve body, said member being partially disposed in each of the first and second portions to slidably receive the valve stem;
   a plurality of axially extending apertures being annularly disposed in said bushing member, providing fluid communication between the drain cavity and the control fluid cavity;
   and the second closure member being disposed between said bushing member and the piston member to block said apertures and prevent fluid communication between the two cavities.

7. The structure recited in claim 6 wherein the valve stem has an annular shoulder which is in a spaced relation with the second closure member when the first closure member is in the blocking position to allow the stem and first closure member to move before the shoulder engages and lifts the second closure member.

8. The structure recited in claim 1 and further including sealing means to substantially prevent control fluid leakage from the control cavity to the area between the piston member and the second closure member.

9. The structure recited in claim 8 wherein means are provided in the second closure member to drain off any leakage of control fluid seeping past the sealing means.

* * * * *